G. W. WILLIAMSON.

2 Sheets—Sheet 1.

Heating Apparatus.

No. 1,445.

Reissued March 31. 1863.

WITNESSES:

Geo. F. Adams

Wm. Smallwood

INVENTOR.

Geo. W. Williamson

N. PETERS. Photo-Lithographer, Washington, D. C.

G. W. WILLIAMSON.

2 Sheets—Sheet 2.

Heating Apparatus.

No. 1,445.

Reissued March 31, 1863.

WITNESSES:

INVENTOR.

Geo. W. Williamson

N. PETERS, Photo-Lithographer, Washington, D. C.

UNITED STATES PATENT OFFICE.

GEORGE W. WILLIAMSON, OF GOULDSBOROUGH, PENNSYLVANIA.

IMPROVEMENT IN HEATING APPARATUS.

Specification forming part of Letters Patent No. 22,760, dated January 25, 1859; Reissue No. 1,445, dated March 31, 1863.

*To all whom it may concern:*

Be it known that I, GEORGE W. WILLIAMSON, of Gouldsborough, in the county of Luzerne and State of Pennsylvania, formerly of Scranton, in the county and State aforesaid, have invented a new and Improved Mode of Applying Heat to Radiating-Surfaces; and I do hereby declare that the following is a full and exact description thereof, reference being had to the accompanying drawings, and to the letters of reference marked thereon.

Figure 3:
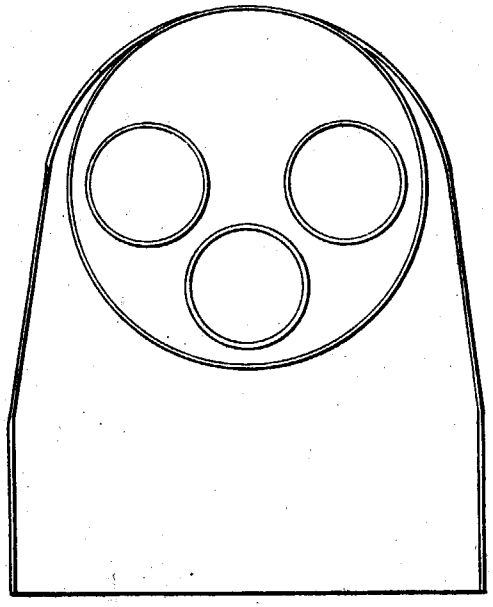
Figure 4:
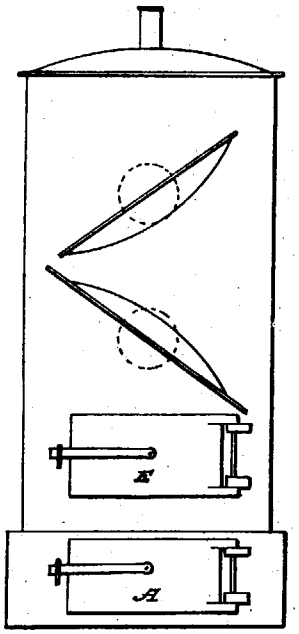
Figure 1:
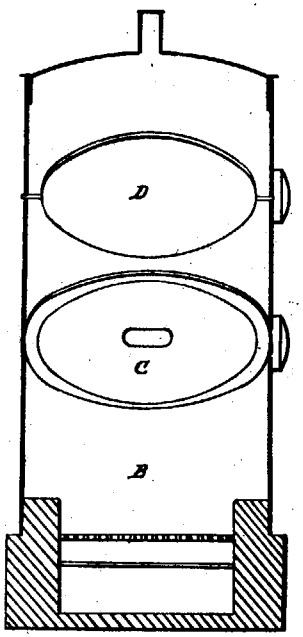
Figure 2:
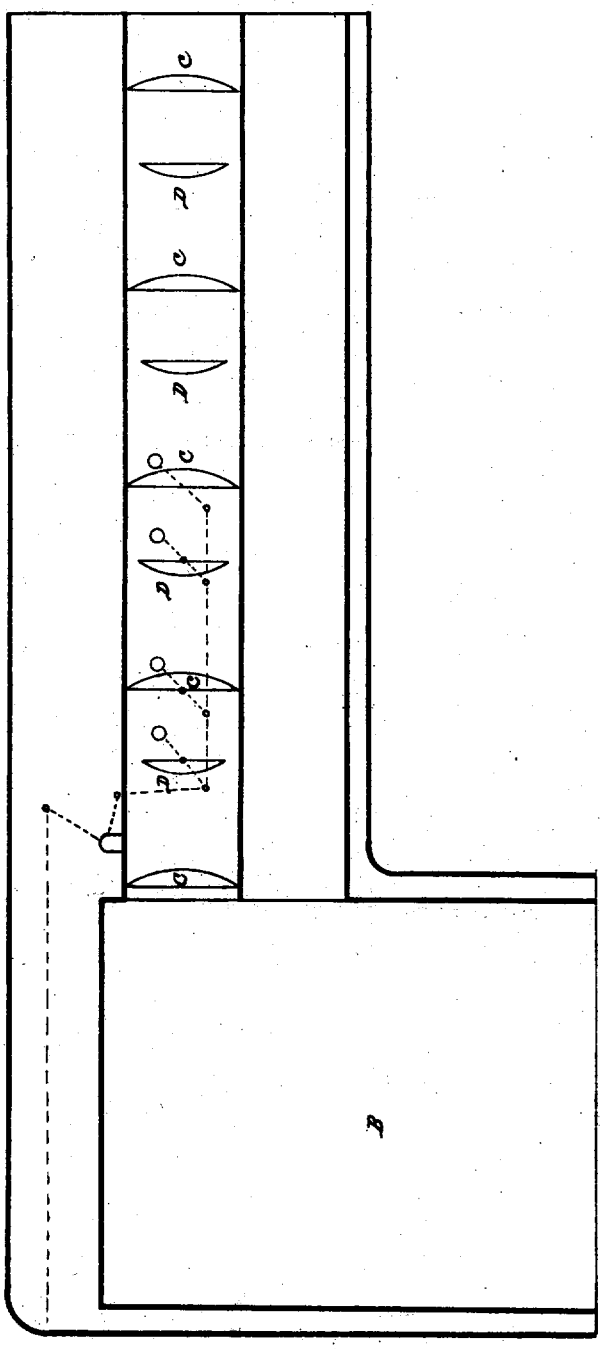

In said drawings, Figure 1 represents a sectional elevation of an ordinary cylinder-stove, showing the arrangement and application of my improvement applied thereto. Fig. 2 represents a horizontal section of one flue of a steam-boiler with my invention applied. Fig. 3 represents the front of a fire-chamber or fire-surface of a locomotive-boiler. Fig. 4 represents an exterior elevation of the cylinder-stove shown in Fig. 1.

Similar letters refer to similar parts throughout.

A in said drawings, Fig. 4, indicates the ash-pit door of an ordinary stove. B, Fig. 1, represents the fire-chamber therein. C, Fig. 1, shows a concavo-convex plate fitted in and closing the chamber, except an opening in its center of suitable size for the passage of the draft and heat. D also represents a plate of similar form, but of less diameter and without the center opening. This plate D is suspended in the chamber, so as to leave a passage between its outer edge and the inner surface of the chamber.

C D C D, &c., Fig. 2, show a series of plates constructed and arranged in accordance with my invention and applied in the flue of a steam-boiler. These plates may be either concavo-convex or flat or conical.

Fig. 4 shows the door of the fire-chamber of an ordinary cylinder-stove.

The plates may all be hung upon bearings or journals and arranged so as to revolve when desired, to facilitate cleaning or to open the chamber or flue for a free draft when less heat is required from the surface.

The object of my invention is to generate a greater amount of heat with a given quantity of fuel than by any other mode now in use.

The nature of my invention consists in placing within a fire-chamber, smoke-flue, or boiler-flue a series of plates so arranged that heat in its passage is delayed or retarded and circulated between and around said plates, so as to bring all the heat in direct contact with the surface of the chamber, and thereby retain or throw out a greater amount of heat from the same quantity of fuel than by any other method now in practice.

To enable others skilled in the art to make and use my invention, I will proceed to describe its operation.

Fire being started in the fire box or chamber, a current of heat is transmitted through the opening in the center of plate C, and in its onward passage it expands to pass around the next plate, D, which deflects said current against the sides of the chamber or flue in its passage between it and the edge of the plate to the next plate, where it is again contracted or brought to the center to pass through the opening in plate C, and so on to the end of the series, alternating through and around the plates.

By the application of my improvement no impediment is made to the draft, which evil has been in the way of the successful working of many plans heretofore devised for reducing the cost of motive power. By arranging plates with a draft-passage alternating first through the center of one plate and then between the edge of the succeeding and the wall of the fire-chamber the heat is brought in contact with the surface of the chamber without reducing the size of the passage so much as to destroy the draft; and by this arrangement a great saving of fuel is effected.

The economizing of fuel has long been a desideratum with almost all who use steam as a motive power, and it is in many localities equally as important to save as much as possible in the household uses of fuel. The use of my invention will do this in every situation where it can be applied, and in many instances the saving will be more than one-half.

Having described the nature and operation of my invention, I wish it distinctly understood that I do not claim dampers or their equivalent in my invention. Neither do I claim a stationary plate or a series of them with openings around the edges for a draft-passage.

Neither do I claim to be the inventor of a combustion-chamber within a heating or smoke flue; but

What I claim, and desire to secure by Letters Patent, is—

The application to stoves, flues of steam-boilers, smoke-stacks, or chimneys, or wherever it is required to arrest heat or sparks, of a series of plates with openings for draft-passages, alternating as herein described, and for the purposes set forth.

GEORGE W. WILLIAMSON.

Witnesses:
PETER STECKEL,
HENRY F. STECKEL.